United States Patent
Fujita et al.

(10) Patent No.: US 9,555,713 B2
(45) Date of Patent: Jan. 31, 2017

(54) CONTACTLESS POWER TRANSMISSION DEVICE

(71) Applicant: PANASONIC CORPORATION, Osaka (JP)

(72) Inventors: Atsushi Fujita, Shiga (JP); Yoshihiro Sakamoto, Nara (JP); Yoshiharu Omori, Shiga (JP); Hideki Sadakata, Shiga (JP); Takashi Kashimoto, Nara (JP); Hiroaki Kurihara, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 372 days.

(21) Appl. No.: 14/198,944

(22) Filed: Mar. 6, 2014

(65) Prior Publication Data

US 2014/0197693 A1   Jul. 17, 2014

Related U.S. Application Data

(63) Continuation of application No. PCT/JP2012/006918, filed on Oct. 29, 2012.

(30) Foreign Application Priority Data

Oct. 28, 2011   (JP) .................. 2011-236895

(51) Int. Cl.
*H02J 17/00*   (2006.01)
*H02J 5/00*   (2016.01)
(Continued)

(52) U.S. Cl.
CPC ........... *B60L 11/1811* (2013.01); *B60L 11/182* (2013.01); *H01F 38/14* (2013.01);
(Continued)

(58) Field of Classification Search
CPC ..... B60L 11/1824; B60L 11/182; H02J 5/005; H02J 7/025; H02J 17/00; H02J 50/10; H02J 5/12; H02J 50/60; Y02T 10/7088; Y02T 90/122; H01F 38/14; H04B 5/0037
See application file for complete search history.

(56) References Cited

U.S. PATENT DOCUMENTS

| | | | |
|---|---|---|---|
| 8,946,938 B2 * | 2/2015 | Kesler ................... | B60L 11/182 307/10.1 |
| 2009/0021219 A1 | 1/2009 | Yoda et al. | |

(Continued)

FOREIGN PATENT DOCUMENTS

| JP | H07-16553 A | 3/1995 |
|---|---|---|
| JP | 2006-230032 A | 8/2006 |

(Continued)

OTHER PUBLICATIONS

International Search Report issued in International Application No. PCT/JP2012/006918 with Date of mailing Dec. 25, 2012, with English Translation.

(Continued)

*Primary Examiner* — Ryan Johnson
(74) *Attorney, Agent, or Firm* — McDermott Will & Emery LLP (57) ABSTRACT

A contactless power transmission device includes a power receiver, a power feeder configured to contactlessly feed power to the power receiver, the power feeder including a primary coil configured to generate magnetic flux by an input alternating current voltage, and a cover configured to cover the primary coil, and a capacitive sensor configured to supply an alternating current voltage to an electrode to measure a capacitance occurring between the electrode and foreign matter present around the cover and thereby detect the foreign matter. The frequency of the alternating current (Continued)

voltage of the capacitive sensor is set to be higher than the frequency of the magnetic flux generated by the primary coil.

4 Claims, 6 Drawing Sheets

(51) Int. Cl.
  *H02J 7/02* (2016.01)
  *B60L 11/18* (2006.01)
  *H01F 38/14* (2006.01)

(52) U.S. Cl.
  CPC .............. *H02J 7/025* (2013.01); *H02J 7/027* (2013.01); *H02J 50/10* (2016.02); *H02J 50/60* (2016.02); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 2010/0253153 A1* | 10/2010 | Kondo | H01F 27/2876 307/104 |
| 2012/0146580 A1* | 6/2012 | Kitamura | H01F 38/14 320/108 |
| 2013/0088091 A1 | 4/2013 | Yoda et al. | |

FOREIGN PATENT DOCUMENTS

| | | | |
|---|---|---|---|
| JP | 2008-019619 A | 1/2008 | |
| JP | 2008-087733 A | 4/2008 | |
| JP | 2009-205050 A | 9/2009 | |
| JP | WO 2011036863 A1 * | 3/2011 | ............. H01F 38/14 |

OTHER PUBLICATIONS

Communication pursuant to Article 94(3) EPC, issued in corresponding European Patent Application No. 12 843 746.4, mailed on Apr. 15, 2016.

* cited by examiner

CONTACTLESS POWER TRANSMISSION DEVICE

CROSS-REFERENCE TO RELATED APPLICATIONS

This is a continuation of International Application No. PCT/JP2012/006918 filed on Oct. 29, 2012, which claims priority to Japanese Patent Application No. 2011-236895 filed on Oct. 28, 2011. The entire disclosures of these applications are incorporated by reference herein.

BACKGROUND

The present disclosure relates to contactless power transmission devices used for charging, for example, electric propulsion vehicles, such as electric vehicles, plug-in hybrid vehicles, etc.

Figure 8:
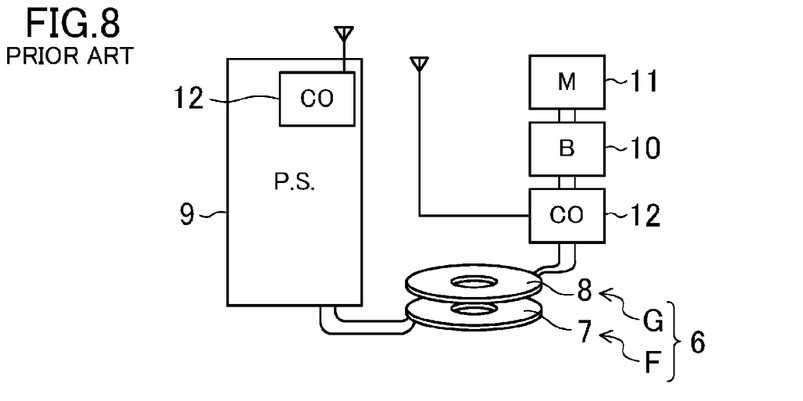
FIG. 8 is a diagram schematically showing a configuration of a conventional contactless power transmission device.

FIG. 8 is a diagram schematically showing a configuration of a conventional contactless power transmission device 6 (see, for example, Japanese Unexamined Patent Publication No. 2008-87733). In FIG. 8, a contactless power feeder (primary device) F which is provided on the ground and is connected to the power source board of a power source 9 is positioned during power feed, facing a power receiver (secondary device) G which is mounted in an electric propulsion vehicle, without physical contact therebetween, i.e., with an air gap (empty space) being interposed therebetween. In such an arrangement, when an alternating current is applied to a primary coil 7 included in the power feeder F to generate magnetic flux, electromotive force is induced in a secondary coil 8 included in the power receiver G, whereby power is contactlessly transmitted from the primary coil 7 to the secondary coil 8.

The power receiver G is connected to, for example, an in-vehicle battery 10, which is charged with the above transmitted power. An in-vehicle motor 11 is driven by the power accumulated in the in-vehicle battery 10. Note that, during the contactless power feed process, necessary information is exchanged between the power feeder F and the power receiver G by, for example, a wireless communication device 12.

Figure 9A:
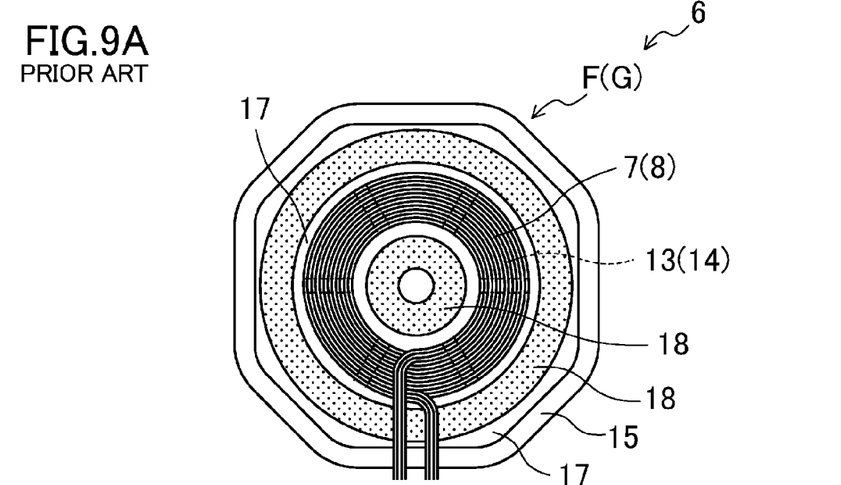
FIGS. 9A and 9B are diagrams schematically showing an internal structure of a power feeder and a power receiver of FIG. 8.
Figure 9B:
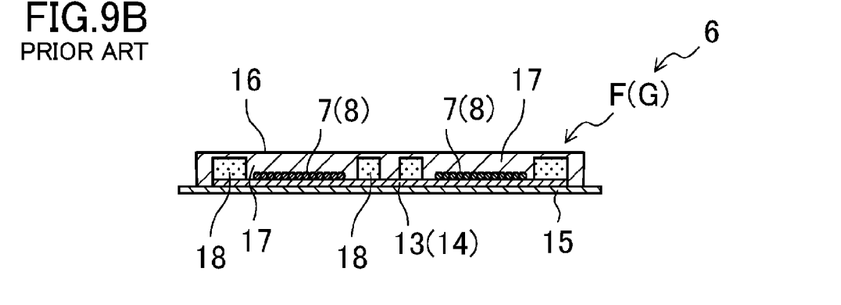

FIGS. 9A and 9B are diagrams schematically showing an internal structure of the power feeder F and the power receiver G. In particular, FIG. 9A is a diagram schematically showing an internal structure of the power feeder F as viewed from the top or the power receiver G as viewed from the bottom. FIG. 9B is a diagram schematically showing an internal structure of the power feeder F and the power receiver G as viewed from the side.

In FIGS. 9A and 9B, the power feeder F includes the primary coil 7, a primary magnetic core 13, a back plate 15, a cover 16, etc. The power receiver G includes the secondary coil 8, a secondary magnetic core 14, a back plate 15, a cover 16, etc., and briefly, has a structure symmetric to that of the power feeder F. The surfaces of the primary coil 7 and the primary magnetic core 13, and the surfaces of the secondary coil 8 and the secondary magnetic core 14, are each covered and fixed with a molded resin 17 containing a foam material 18.

Specifically, in the power feeder F and the power receiver G, a space between the back plate 15 and the cover 16 is filled with the molded resin 17, and therefore, the surfaces of the primary and secondary coils 7 and 8 and the surfaces of the primary and secondary magnetic cores 13 and 14 are covered and fixed. The molded resin 17 is formed of, for example, silicone resin. Because the internal space is thus filled with the solid resin, the primary and secondary coils 7 and 8 can be positioned and fixed, and therefore, their mechanical intensity can be ensured, and at the same time, their heat can be dissipated. Specifically, the passage of an excitation current through the primary and secondary coils 7 and 8 releases Joule heat, which is then dissipated by heat conduction through the molded resin 17, and therefore, the primary and secondary coils 7 and 8 are cooled.

SUMMARY

The power feeder F and the power receiver G are usually placed outdoors, and therefore, foreign matter may happen to ride thereon. In particular, when a metal object which is as an example of foreign matter is present on the cover 16 during power transmission, then if the metal object is left thereon, the metal object is overheated. Also, in particular, if foreign matter which is a conducting loop object which can be linked with magnetic flux is inserted between the primary and secondary coils 7 and 8, electromotive force occurs at the opposite ends of the conducting object. If the temperature of the foreign matter left on the cover 16 excessively increases, the power feeder F or the power receiver G is likely to be damaged, including failure etc. Therefore, there is a demand for a technique of reliably detecting the presence of foreign matter between the primary and secondary coils 7 and 8 during power transmission.

The present disclosure describes implementations of a contactless power transmission device which can reliably detect the presence of foreign matter.

A contactless power transmission device according to an embodiment of the present disclosure includes a power receiver, a power feeder configured to contactlessly feed power to the power receiver, the power feeder including a primary coil configured to generate magnetic flux by an input alternating current voltage, and a cover configured to cover the primary coil, and a capacitive sensor including an electrode and configured to supply an alternating current voltage to the electrode to measure a capacitance occurring between the electrode and foreign matter present around the cover and thereby detect the foreign matter. The frequency of the alternating current voltage of the capacitive sensor is set to be higher than the frequency of the magnetic flux generated by the primary coil.

In another embodiment of the present disclosure, the capacitive sensor includes a voltage supply unit configured to supply the alternating current voltage to the electrode, and a capacitance measurement unit configured to measure the capacitance occurring the electrode and the foreign matter.

In another embodiment of the present disclosure, when the intensity of the magnetic flux is low, the frequency of the alternating current voltage and the frequency of the magnetic flux are set to be close to each other.

The above configuration allows the capacitive sensor to reliably detect when foreign matter is present around the cover. The capacitive sensor can also easily and reliably detect, in a wide range around the cover, an object (foreign matter) which is likely to increase the temperature. Therefore, an excessive increase in temperature of foreign matter present around the cover can be reduced or prevented, whereby extensive damage such as the failure of the device etc. can be reduced or prevented, resulting in an improvement in safety.

The capacitive sensor supplies an alternating current voltage to the electrode to measure the capacitance between the electrode and foreign matter. The measurement result is affected by the magnetic flux from the primary coil or a concomitant electric field. In particular, if the frequency of the magnetic flux from the primary coil is the same as the frequency of the supplied alternating current voltage, the influence is significant, and therefore, a large error occurs in the measurement of the capacitance.

However, in the above configuration of the present disclosure, the frequency of the supplied alternating current voltage is set to be higher than the frequency of the magnetic flux from the primary coil, and therefore, the speed at which the magnetic flux of the primary coil changes is smaller than the speed at which the alternating current voltage changes.

For example, if the time it takes to measure the capacitance is set to be substantially the same as the period of the frequency of the alternating current voltage, the influence of the frequency of the magnetic flux is reduced to a negligible level. If a detection filter for detecting any frequency is provided to attenuate the frequency of the magnetic flux, the influence of the magnetic flux can be easily reduced or eliminated. Therefore, foreign matter which is present between the power feeder and the power receiver can be reliably detected.

The contactless power transmission device of the embodiment of the present disclosure includes a capacitive sensor capable of detecting an object which is present around the cover. A change in the magnetic flux generated in the primary coil with respect to a change in the alternating current voltage supplied to the electrode is reduced. Therefore, it is not necessary to design a detection filter etc., i.e., an external influence, such as design of a detection filter etc., can be reduced or eliminated. Foreign matter which is present between the power feeder and the power receiver can be reliably detected.

DETAILED DESCRIPTION

Embodiments will now be described in detail with reference to the accompanying drawings. The embodiments are in no way intended to limit the scope of the present disclosure.

Figure 1:
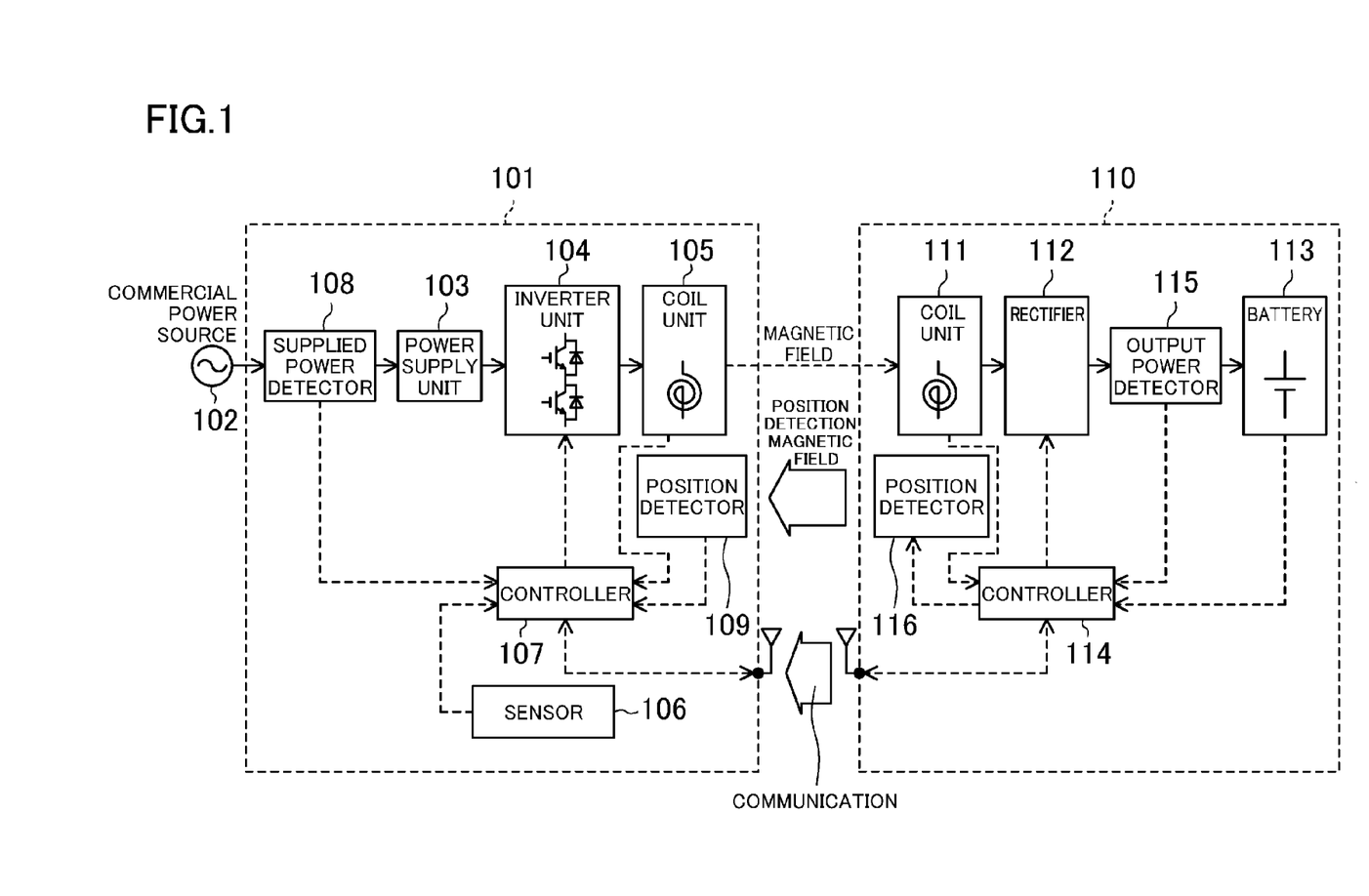
FIG. 1 is a block diagram of a contactless power transmission device according to an embodiment of the present disclosure.
Figure 2:
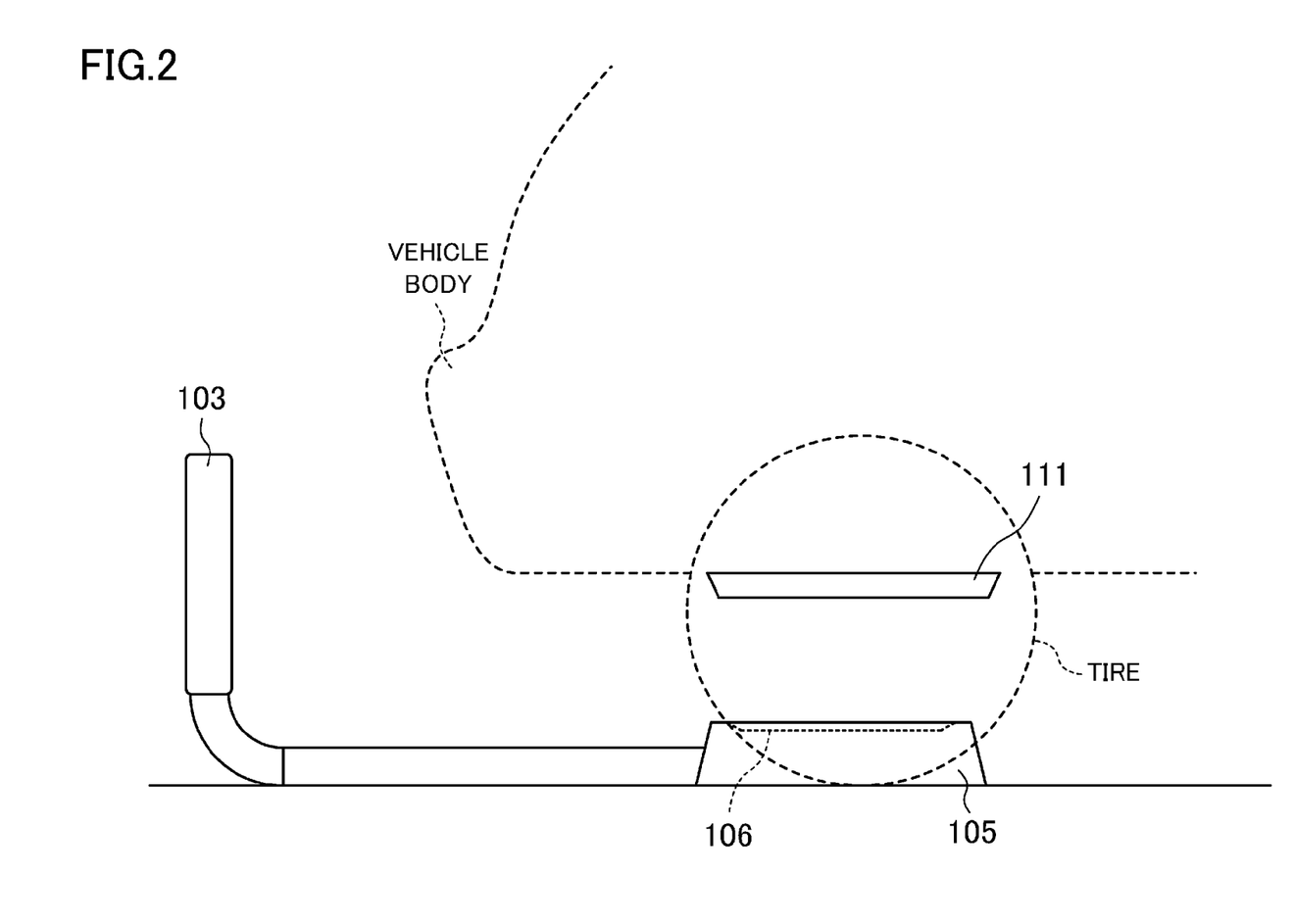
FIG. 2 is an external view of the contactless power transmission device of FIG. 1.

FIG. 1 is a block diagram of a contactless power transmission device according to an embodiment of the present disclosure. FIG. 2 is an external view showing how a vehicle is parked in a parking space. As shown in FIGS. 1 and 2, the contactless power transmission device includes a power feeder 101 installed in, for example, in a parking space, and a power receiver 110 mounted in, for example, an electric propulsion vehicle.

The power feeder 101 includes a power supply unit 103 connected to a commercial power source 102, an inverter unit 104, a primary coil unit 105, a capacitive sensor 106 (hereinafter referred to as "the sensor 106"), a power feeder controller 107 (hereinafter referred to as "the controller 107") such as a microcomputer, a supplied power detector 108, and a position detector 109.

On the other hand, the power receiver 110 includes a secondary coil unit 111, a rectifier 112, a battery (load) 113, a power receiver controller 114 (hereinafter referred to as "the controller 114") such as a microcomputer, an output power detector 115, and a position detector 116.

In the power feeder 101, the commercial power source 102, which is, for example, a low-frequency alternating-current power source of 200 V, is connected through the supplied power detector 108 to an input end of the power supply unit 103. An output end of the power supply unit 103 is connected to an input end of the inverter unit 104. An output end of the inverter unit 104 is connected to the primary coil unit 105.

The power supply unit 103 converts alternating current power into direct current power, and supplies the direct current power to the inverter unit 104. The inverter unit 104 performs switching operation under the control of the controller 107 to convert the power from the power supply unit 103 into alternating current power and supply the alternating current power to the primary coil unit 105. Note that the primary coil unit 105 is placed on, for example, the ground, and the power supply unit 103 is, for example, separated by a predetermined distance from the primary coil unit 105.

Power (a voltage and a current) output from the commercial power source 102 is detected by the supplied power detector 108, and the resultant detection signal is output to the controller 107. Note that the supplied power detector 108 may detect the magnitude of power output from the power feeder 101.

In the power receiver 110, an output end of the secondary coil unit 111 is connected to an input end of the rectifier 112. An output end of the rectifier 112 is connected to the battery 113 as a load. The secondary coil unit 111 generates electromotive force induced from magnetic flux from the primary coil unit 105. The rectifier 112 rectifies power generated by the secondary coil unit 111, and supplies the rectified power to the battery 113. The power (a voltage and a current) supplied to the battery 113 is detected by the output power detector 115, and the resultant detection signal is output to the controller 114. Note that the secondary coil unit 111 is, for example, attached to a bottom portion of a vehicle body, such as a chassis etc. The output power detector 115 may also detect the magnitude of power fed to the power receiver 110.

The position detector 109 of the power feeder 101 receives a high-frequency magnetic field having a predetermined frequency generated by the position detector 116 of the power receiver 110. The controller 107 finds out, from the magnetic field level of the high-frequency magnetic field received by the position detector 109, a positional relationship between the power feeder 101 and the power receiver 110, more specifically a positional relationship between the primary and secondary coil units 105 and 111. As a result, the controller 107, when determining that the positional relationship between the primary and secondary coil units 105 and 111 is appropriate for charging, notifies the controller 114 that the contactless power transmission device is ready to perform charging, via wireless communication.

The controller 114, when receiving the notification from the controller 107, notifies a vehicle's control device (not shown), via wired communication, that charging is ready. The vehicle's control device (not shown), when receiving the notification that the contactless power transmission device is ready to perform charging and also receiving the user's operation, outputs a charge start command to the controller 114.

Thereafter, the controller 114 determines a power command value corresponding to the state of charge of the battery 113, and transmits the power command value to the controller 107. The controller 114 also transmits, to the controller 107, an output power value which indicates the power detected by the output power detector 115. The controller 107 compares the power command value and the output power value received from the controller 114, and drives and controls the inverter unit 104 so that the power feeder 101 can feed desired output power. Note that the controller 114 may transmit only the power command value to the controller 107. In this case, the controller 107 may drive and control the inverter unit 104 based on the result of comparison of a value indicating the power supplied to the primary coil unit 105 or a value indicating the power detected by the supplied power detector 108 with the power command value.

Here, the controller 107 drives and controls the inverter unit 104 so that the inverter unit 104 has a switching frequency of, for example, 20-30 kHz. This is because, when the inverter unit 104 has such a switching frequency, the drive frequency is caused not to fall within the audible frequency range while a high-frequency loss due to the inverter unit 104 and a primary coil 122 is reduced to the extent possible. Because the inverter unit 104 is driven at 20-30 kHz, the fundamental wave of magnetic flux generated by the primary coil 122 has a similar frequency.

When power is being fed from the power feeder 101 to the power receiver 110, the controller 114 changes the power command value to the controller 107 based on the power detected by the output power detector 115, in order to reduce or prevent an overcurrent or overvoltage applied to the battery 113.

FIG. 2 is an external view of the contactless power transmission device of FIG. 1. As shown in FIG. 2, when power is fed from the power feeder 101 to the power receiver 110, a vehicle is appropriately moved so that the secondary coil unit 111 and the primary coil unit 105 are positioned to face each other, and the controller 107 drives and controls the inverter unit 104. As a result, a high-frequency electromagnetic field is formed between the primary and secondary coil units 105 and 111. The power receiver 110 extracts power from the high-frequency electromagnetic field, and charges the battery 113 with the extracted power.

The sensor 106, which is used to determine whether or not foreign matter is present in or near the high-frequency electromagnetic field region, is provided, for example, in the primary coil unit 105 of the power feeder 101 as shown in FIG. 2. The sensor 106 will be described in detail below.

Note that the term "foreign matter" as used herein refers to matter, such as a human, an object, etc., which may be present in the high-frequency electromagnetic field region, particularly a metal piece etc. whose temperature may increase due to the electromagnetic field to cause extensive damage.

Figure 3:
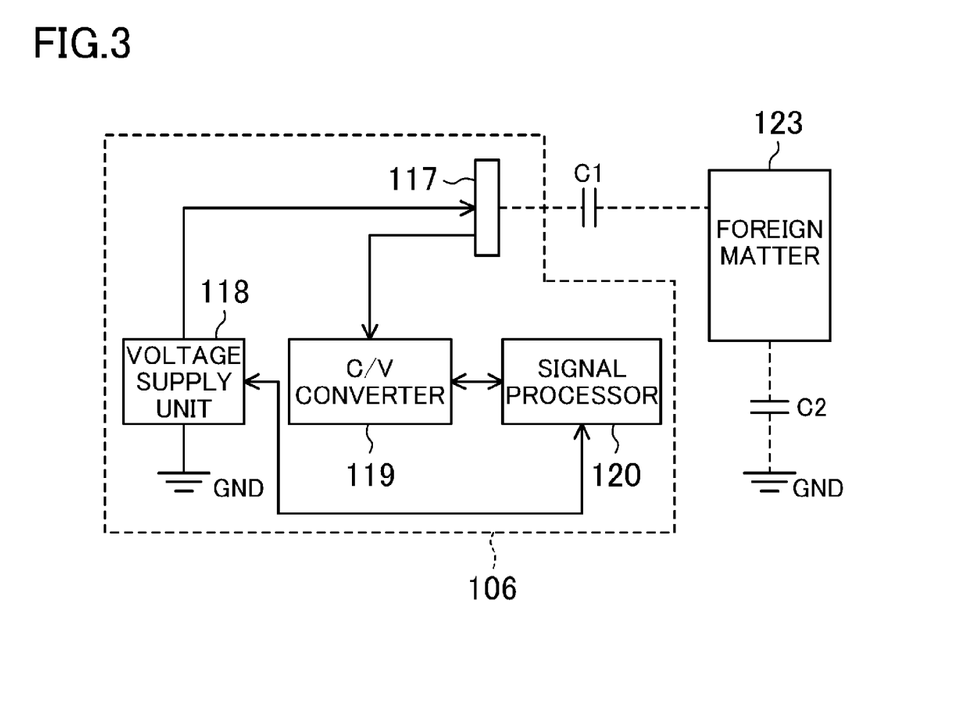
FIG. 3 is a block diagram showing an example configuration of a capacitive sensor of FIG. 1.

FIG. 3 is a block diagram showing an example configuration of a capacitive sensor. The sensor 106 is, for example, configured to measure a capacitance between an electrode and foreign matter, and detect the foreign matter based on a change in the measured capacitance. The sensor 106 includes an electrode 117, a voltage supply unit 118 which supplies an alternating current voltage, a C/V converter 119 as a capacitance measurement unit, and a signal processor 120. The frequency of the alternating current voltage supplied from the voltage supply unit 118 is set to be, for example, 10 times as high as the frequency of the magnetic flux generated by the primary coil 122, i.e., about 200 kHz.

Figure 4:
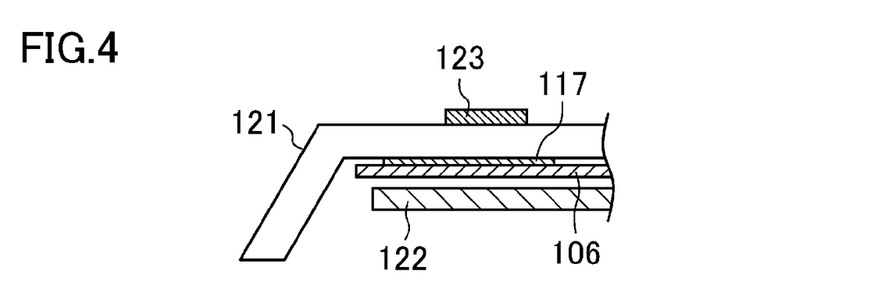
FIG. 4 is a partial cross-sectional view of a power feeder.

FIG. 4 is a partial cross-sectional view of the power feeder 101. Specifically, as shown in FIG. 4, the sensor 106 and the electrode 117 are provided behind a cover 121 covering the primary coil unit 105, i.e., in an inner space of the cover 121. The cover 121 of the primary coil unit 105 is attached to cover and protect the primary coil 122 from above. The electrode 117 of the sensor 106 is provided between the cover 121 and the primary coil 122 so that the electrode 117 can measure a capacitance between itself and foreign matter 123 which is present around the cover 121. In other words, the electrode 117 is provided behind the cover 121 to be protected from impact etc. from the outside of the cover 121.

Note that the electrode 117 may be incorporated into the cover 121 while not being exposed to the outside.

Referring back to FIG. 3, the voltage supply unit 118 applies, to the electrode 117, a predetermined potential with reference to the ground (GND) potential. As a result, a capacitance C1 occurs between the electrode 117 and the foreign matter 123. In this case, the capacitance C1 is represented by:

$$C1 = \frac{\varepsilon 0 \times \varepsilon r \times S}{d} \quad (1)$$

where ϵ0 represents the vacuum permittivity, ϵr represents the relative permittivity, S represents the minimum area where the electrode 117 and the foreign matter 123 overlap, and d represents the distance between the electrode 117 and the foreign matter 123.

The C/V converter 119 converts the capacitance C1 into a voltage value. Here, it is assumed that the C/V converter 119 converts the capacitance C1+C2 into a corresponding voltage value, where C2 represents a capacitance between the foreign matter 123 and the GND potential.

The signal processor 120 performs a process of generating a signal corresponding to the voltage value obtained by the conversion performed by the C/V converter 119. The signal processor 120 has a processing time which is based on the frequency of the alternating current voltage supplied from the voltage supply unit 118. In this embodiment, the processing time of the signal processor 120 is synchronous with one period of the frequency of 200 kHz. When the alternating current voltage is supplied from the voltage supply unit 118 to the signal processor 120, the signal processor 120 starts signal processing after a delay time including the time it takes for the C/V converter 119 to measure the capacitance. After one period of the frequency of 200 kHz has passed since the start of the signal processing, the signal processor 120 completes the signal processing, and outputs a detection reset signal to the C/V converter 119. The C/V converter 119 returns to the initial state according to the detection reset signal.

The signal processor 120 transmits a signal corresponding to the voltage value obtained by the conversion performed by the C/V converter 119, i.e., a signal corresponding to the capacitances C1+C2, to the controller 107 of the power feeder 101 of FIG. 1.

During power feed, the influence of the magnetic flux from the primary coil 122 and a concomitant electric field cause a voltage or current which is applied from the primary coil 122 through the electrode 117 to the C/V converter 119. The C/V converter 119 measures the capacitance based on the voltage or current applied to itself irrespective of the alternating current voltage from the voltage supply unit 118 or the magnetic flux from the primary coil 122. Therefore, the voltage or current caused by the magnetic flux from the primary coil 122 and the electric field may be a factor which causes an error in measurement of the capacitance.

However, in this embodiment, the frequency of the alternating current voltage is set to be about 10 times as high as the frequency of the magnetic flux, and therefore, when the signal processor 120 is performing signal processing, a change in the magnetic flux or the electric field is considerably small and can be considered as substantially a direct current component. In other words, the capacitance occurs only due to the alternating current voltage and can be measured, and therefore, the influence of a change in the magnetic flux and the electric field can be substantially eliminated.

The C/V converter 119 returns to the initial state every time the signal processor 120 has completed signal processing, i.e., every period of 200 kHz, and therefore, the cumulative influence of the magnetic flux and the electric field can be reduced or eliminated.

Thus, by setting the frequency of the alternating current voltage supplied from the voltage supply unit 118 to be higher than the frequency of the magnetic flux, the influence of the magnetic flux can be reduced or eliminated. In other words, the sensor 106 can be used to reliably detect foreign matter.

The controller 107 compares the detection signal output from the signal processor 120 with a threshold set therein. The threshold is used to determine whether or not the detection result of the sensor 106 is positive, i.e., whether or not foreign matter is actually present. When the value of the detection signal exceeds the threshold, the controller 107 determines that the detection result of the sensor 106 is positive, i.e., that foreign matter is present, and transitions to a predetermined operation mode in the presence of foreign matter. Thus, the controller 107 has a function of determining whether or not foreign matter is actually present.

In FIGS. 3 and 4, as the foreign matter 123 is closer to the electrode 117, d in Expression 1 decreases and therefore C1 increases. As a result, the capacitance measured by the sensor 106 increases, and therefore, the detection accuracy of the foreign matter 123 is improved. Therefore, if the sensor 106 is provided at an appropriate position, the presence of the foreign matter 123 around the cover 121 of the power feeder 101 can be reliably detected.

Figure 5:
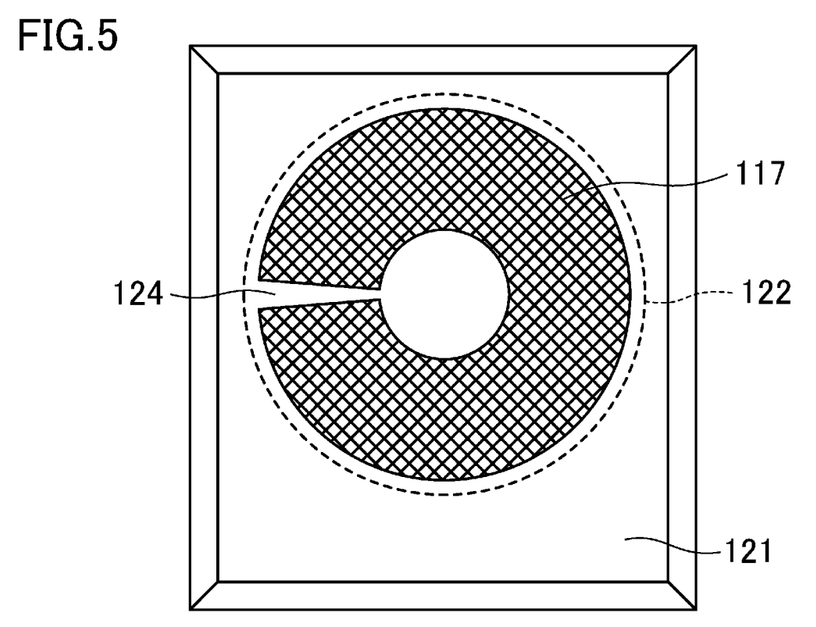
FIG. 5 is an external view showing an example configuration of an electrode included in the capacitive sensor.
Figure 6:
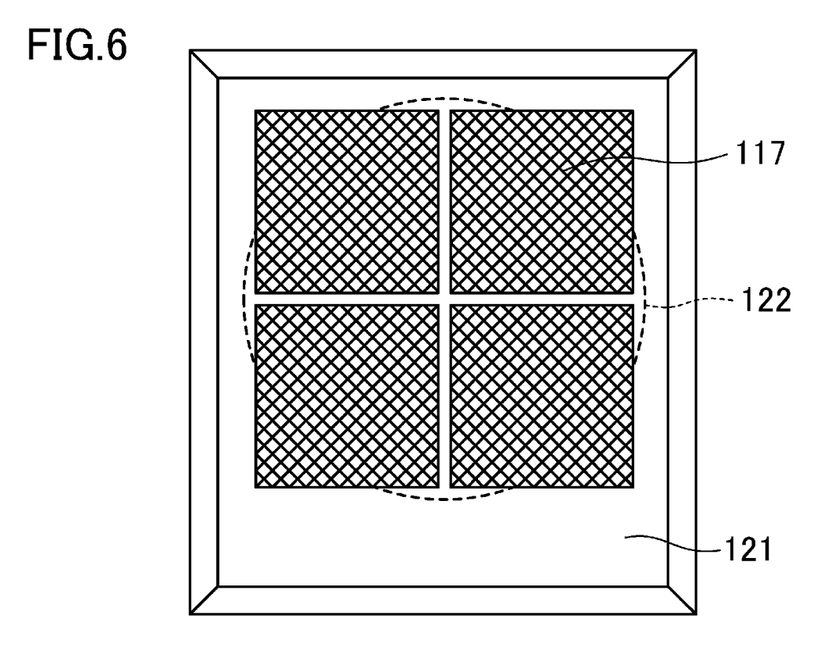
FIG. 6 is an external view showing another example configuration of the electrode included in the capacitive sensor.

FIGS. 5 and 6 are external views showing an example configuration of an electrode of a capacitive sensor. The sensor 106 detects foreign matter which is present on the cover 121, using the electrode 117 which is provided in a range similar to that of the primary coil 122 as viewed from the top, in order to reduce or prevent a fault, such as an excessive increase in temperature of the present foreign matter due to the magnetic flux.

Note that the electrode 117 itself is likely to have a fault, such as an increase in temperature due to passage of an eddy current etc., due to the magnetic flux of the primary coil 122. Therefore, as shown in FIG. 5, a cut 124 is provided in the electrode 117 to interrupt the current path, whereby the occurrence of the eddy current can be reduced or prevented. As shown in FIG. 6, a plurality of separate electrodes 117 may be provided in a range substantially similar to that of the primary coil 122 as viewed from the top. In this case, similar to the case of FIG. 5, a sufficient detection range can be ensured while a fault, such as an increase in temperature due to the eddy current etc., can be reduced or prevented.

When a plurality of separate electrodes 117 are provided as shown in FIG. 6, then if the detection results of the electrodes 117 are compared with each other, a location or size of foreign matter may be determined. If the detection results of the electrodes 117 all exhibit similar tendencies to change, all the electrodes 117 can be determined to be affected by changes over time (aging) etc. Therefore, a criterion for determining whether or not foreign matter is present may be modified to increase the accuracy of detection. While the electrode 117 may have any size, the electrode 117 preferably has such a size as to cover a range required for detection of foreign matter.

Next, foreign matter detection and transmission power control will be described with reference to flowcharts shown in FIGS. 7A and 7B.

Figure 7A:
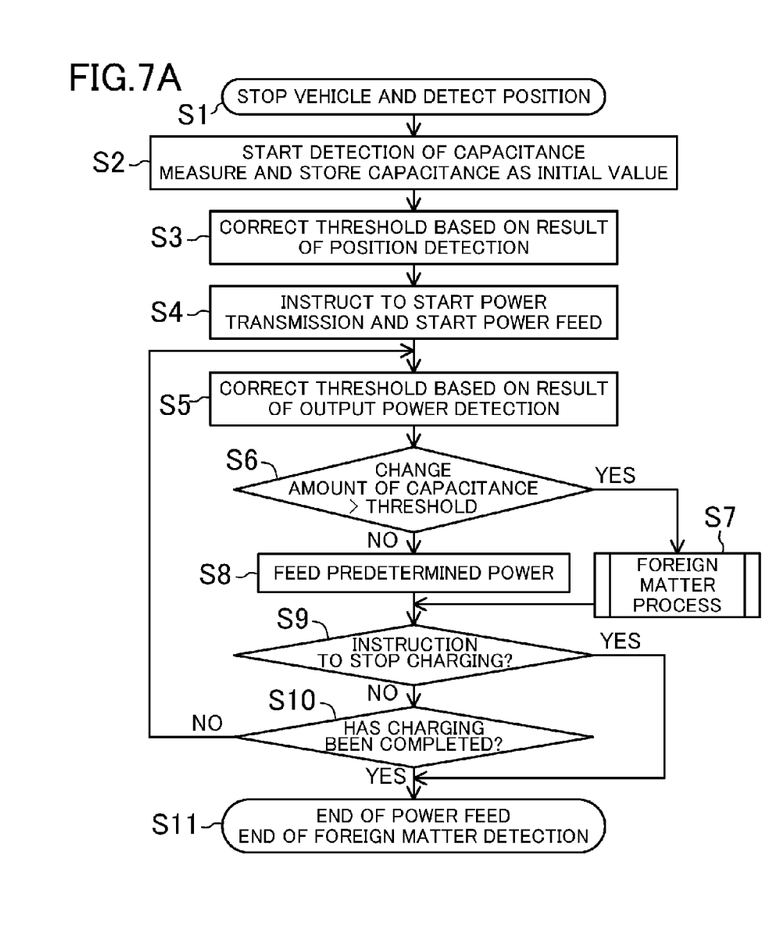
FIGS. 7A-7B are flowcharts showing a foreign matter detection process, a transmission power control process, and a process which is performed when foreign matter has been detected, in the contactless power transmission device of FIG. 1.

In step S1 of FIG. 7A, a vehicle is parked at an appropriate position so that the secondary coil unit 111 of the power receiver 110 mounted in the vehicle faces the primary coil unit 105 of the power feeder 101.

Thereafter, the position detector 116 generates a high-frequency magnetic field having a predetermined frequency according to a command from the controller 114. The position detector 109 receives the magnetic field level of the high-frequency magnetic field (the position detection magnetic field indicated by an arrow in FIG. 1) from the position detector 116, and notifies the controller 107 of the received magnetic field level. The controller 107 finds the positional relationship between the primary and secondary coil units 105 and 111 based on the magnetic field level.

If the controller 107 determines that the positional relationship is appropriate, in step S2 the sensor 106 starts capacitance measurement operation, and a capacitance measured by the sensor 106 at this time is stored as an initial value into the controller 107. For example, the electrode 117 is used for the capacitance measurement performed by the sensor 106, and the electromagnetic field region over the cover 121 covering the primary coil unit 105 is a region where foreign matter is to be detected. In other words, the sensor 106 detects foreign matter by measuring a capacitance which occurs in the electromagnetic field region over the cover 121.

In step S3, when determining, based on the magnetic field level received by the position detector 109, that there is a large distance between the primary and secondary coil units 105 and 111, the controller 107 corrects, based on a previously stored data table, a threshold for determining whether or not any foreign matter is present, i.e., whether or not the detection result of foreign matter is positive. This is because, as the high-frequency magnetic field generated by the primary coil 122 during power feed increases, an error is more likely to occur in the capacitance measurement, and as a result, foreign matter may be incorrectly detected or an error in the detection of foreign matter may increase, and also, as the distance between the sensor 106 and the secondary coil unit 111 increases, the influence of the metal part (foreign matter) decreases, and therefore, the threshold is corrected to address these problems.

Therefore, instead of correcting the threshold so that the threshold proportionally increases with an increase in the distance between the primary and secondary coil units 105 and 111, it is necessary to store, in the controller 107, the positional relationship between the primary and secondary coil units 105 and 111 and the correction values for the threshold in association with each other as a data table, for example.

The data table is set based on the positional relationship between the primary and secondary coil units 105 and 111, i.e., the magnetic field level received by the position detector 109. In other words, the controller 107 can change the threshold based on the states of the power receiver 110 and the power feeder 101.

Thereafter, in step S4, the controller 107, when receiving the power command value from the controller 114, instructs the inverter unit 104 to start power transmission. As a result, the inverter unit 104 starts switching operation, and therefore, power starts to be fed from the primary coil unit 105 to the secondary coil unit 111.

In step S5, the controller 107 corrects the threshold based on the output power value received from the controller 114, based on the previously stored data table. This is because an error in the detection of foreign matter increases as the frequency of the high-frequency magnetic field from the primary coil 122 is closer to the operating frequency of the voltage supply unit 118 of the sensor 106 (these frequencies vary depending on the output power value or the state of the battery 113), and also, an error in the detection of foreign matter increases as the high-frequency magnetic field from the primary coil 122 increases and the output power value increases, and therefore, the threshold is corrected to reduce such an error. The data table is set based on the detection output of the output power detector 115. For example, in the data table, the output power values and the correction values for the threshold are listed in association with each other.

In step S6, the controller 107 compares a change amount of the measurement value of the capacitance obtained by the sensor 106 (hereinafter referred to as the "measured capacitance") from the initial value with the threshold, to determine whether or not there is a change in the capacitance due to the presence of foreign matter.

Note that, after the start of power feed and before step S6, the change amount of the measured capacitance from the initial value can be obtained by the sensor 106 measuring the capacitance.

In step S6, if the change amount of the measured capacitance from the initial value exceeds the threshold ("YES" in step S6), it is determined that foreign matter is present, and control proceeds to step S7 in order to reduce or prevent extensive damage due to overheating of foreign matter. In step S7, a foreign matter process for controlling transmission power is performed.

On the other hand, in step S6, if the change amount of the measured capacitance from the initial value is smaller than the threshold ("NO" in step S6), it is determined that foreign matter is not present, and control proceeds to step S8. In step S8, the controller 107 allows the inverter unit 104 to continue power transmission.

Figure 7B:
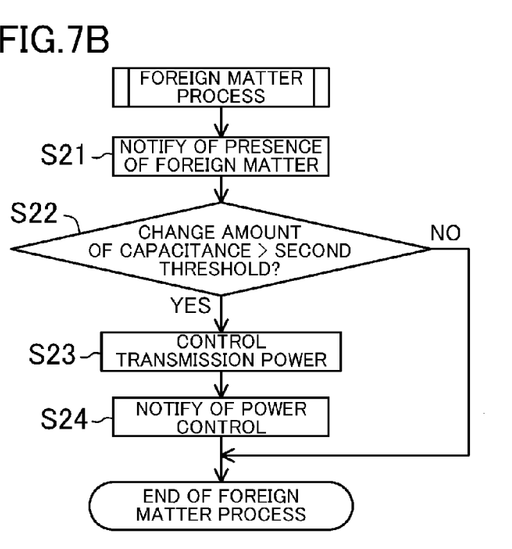

FIG. 7B is a flowchart showing details of the foreign matter process of step S7 of FIG. 7A.

In the foreign matter process, initially, in step S21, the user is notified that foreign matter is present around the cover 121, by means of display, sound, etc.

Next, in step S22, the change amount of the measured capacitance from the initial value is compared with a second threshold for determining whether or not foreign matter is present, thereby performing a detailed determination including reduction or elimination of an aging factor or the degree of danger.

As used herein, the term "aging factor" refers to a change in capacitance due to a change in environment during power feed, such as an increase in temperature of a component included in the contactless power transmission device, a change in weather, etc.

The second threshold is, for example, a value which is obtained by adding a predetermined value to the threshold in view of an aging factor, a limit value for reducing or preventing danger which is determined based on a capacitance value which would occur in the presence of foreign matter and is obtained based on design data, etc.

In step S22, if it is determined that the change amount of the measured capacitance from the initial value exceeds the second threshold ("YES" in step S22), control proceeds to step S23. In step S23, the controller 107 reduces transmission power from the primary coil unit 105 to the secondary coil unit 111 by a predetermined amount (e.g., a factor of 2), or stops power transmission. In step S24, the user is notified that transmission power is controlled in the presence of foreign matter, by means of display, sound, etc., and the foreign matter process is ended.

On the other hand, if it is determined in step S22 that the change amount of the measured capacitance from the initial value is not more than the second threshold ("NO" in step S22), the foreign matter process is ended without performing step S23 or S24.

If, in step S9 of FIG. 7A, there is an instruction to interrupt power transmission because the user removes foreign matter or uses the vehicle, etc. ("YES" in step S9), control proceeds to step S11. In step S11, the controller 107 instructs the inverter unit 104 to end power transmission, and therefore, the power feed from the primary coil unit 105 to the secondary coil unit 111 is stopped, and the sensor 106 ends the capacitance measurement operation.

If, in step S9, there is not an instruction to interrupt power transmission ("NO" in step S9), control proceeds to step S10. In step S10, it is determined whether or not charging has been completed. If the determination result is negative ("NO" in step S10), control returns to step S5, and otherwise ("YES" in step S10), control proceeds to step S11. In step S11, the power feed is ended, and the foreign matter detection operation is also ended.

Thus, in this embodiment, the power feeder 101 includes the sensor 106 which can detect an object which is present around the cover 121. The frequency of the alternating current voltage supplied from the sensor 106 to the electrode 117 is set to be higher than the frequency of the magnetic flux. As a result, the capacitance measured by the sensor 106 is less affected by the magnetic flux, and therefore, the sensor 106 can reliably detect the foreign matter 123. In other words, the sensor 106 can reliably detect when the foreign matter 123 is present between the primary and second coil units 105 and 111.

Specifically, when power is being fed from the power feeder to the power receiver, an error may occur in the capacitance measured by the capacitive sensor due to the magnetic flux etc. In order to reduce such an error, it may be necessary to provide, for example, a filter for eliminating the influence of the magnetic flux. However, if a component such as a filter etc. is mounted in the sensor, the circuit area and cost of the sensor increase.

In contrast to this, in the contactless power transmission device of this embodiment, as described above, the frequency of the alternating current voltage is set to be higher than the frequency of the magnetic flux, and therefore, the influence of the magnetic flux can be ignored. Therefore, an increase in the circuit area and cost of the sensor 106 can be reduced. In addition, the sensor can reliably detect when the foreign matter 123 is present between the primary and secondary coil units 105 and 111.

Note that, in this embodiment, the capacitive sensor 106 is provided in the primary coil unit 105 of the power feeder 101. The present disclosure is not limited to this. Alternatively, for example, the capacitive sensor 106 may be provided in the secondary coil unit 111 of the power receiver 110. Still alternatively, the capacitive sensor 106 may be provided in both the primary coil unit 105 of the power feeder 101 and the secondary coil unit 111 of the power receiver 110.

In the foregoing description, as shown in FIG. 3, a change in capacitance is detected by the C/V converter 119 in the capacitance detection technique of the capacitive sensor 106. The present disclosure is not limited to this. For example, an alternating current voltage whose frequency causes resonance with respect to a capacitance between the electrode 117 and the surrounding in the absence of foreign matter, may be applied to the electrode 117. If the foreign matter 123 approaches in the presence of the applied alternating current voltage, a change occurs in the capacitance, and then causes a change in the resonant frequency, which in turn changes the voltage amplitude. Therefore, a change in the capacitance may be detected based on a change in the voltage amplitude.

Alternatively, an alternating current voltage whose frequency causes resonance with respect to a capacitance between the electrode 117 and the surrounding in the absence of foreign matter, may be applied to the electrode 117. If the foreign matter 123 approaches in the presence of the applied alternating current voltage, a change occurs in the capacitance, and then causes a change in the resonant frequency, which in turn changes the flowing current. Therefore, a change in the capacitance may be detected based on a change in the flowing current.

In the foregoing description, as an example, the frequency of the fundamental wave of the magnetic flux is set to 20-30 kHz, and the frequency of the alternating current voltage supplied from the voltage supply unit 118 is set to 200 kHz. The present disclosure is not limited to this. For example, if the frequency of the fundamental wave of the magnetic flux may be set to 100 kHz, the frequency of the alternating current voltage may be set to be higher than that frequency.

The influence of the magnetic flux on the sensor 106 varies depending on the intensity of the magnetic flux. Therefore, for example, when the intensity of the magnetic flux is high, then even if the frequency of the magnetic flux and the frequency of the alternating current voltage are set to be close to each other, a sufficient level of measurement accuracy of the capacitance can be ensured.

Experiments conducted by the inventors have demonstrated that if the frequency of the alternating current voltage is set to be at least two times as high as the frequency of the magnetic flux, false detection of foreign matter can be reduced.

In the foregoing description, as an example, the signal processor 120 performs signal processing in synchronization with the voltage supply unit 118 so that the signal processing is completed every period of the frequency of the alternating current voltage. The present disclosure is not limited to this. When the signal processing is completed in a period of time which is sufficiently short compared to the frequency of the magnetic flux, then if the signal processing is performed over a plurality of the periods of the frequency of the alternating current voltage, the influence of the magnetic flux can be reduced or eliminated.

In the foregoing description, as an example, the high frequency of the alternating current voltage and the signal processing time of the signal processor 120 are limited to reduce or eliminate the influence of the magnetic flux. The present disclosure is not limited to this. For example, a detection filter, such as a low-pass filter which sufficiently attenuates a frequency component signal of the magnetic flux, a band-pass filter which passes only the frequency of the alternating current voltage, etc. may be provided between the electrode 117 and the C/V converter 119, between the C/V converter 119 and the signal processor 120, etc. In this case, it is not necessary to limit the signal processing time of the signal processor 120, and therefore, the frequency of the magnetic flux may be set to be relatively high, and the frequency of the alternating current voltage may be set to be higher than that frequency. Therefore, these settings are effective when the processing speed of the signal processor 120 cannot be set to be sufficiently high and therefore a significant error is likely to occur.

In the foregoing description, the electrode 117 is provided behind the cover 121. The present disclosure is not limited to this. For example, the electrode 117 may be embedded in the cover 121. In this case, the distance between the foreign matter 123 and the electrode 117 can be reduced, and therefore, the detection accuracy can be improved, and foreign matter can be more consistently detected.

The sensor 106 is not limited to a capacitive sensor. For example, a sheet-like temperature sensor may be provided in contact with the inside of the cover 121 of the primary coil unit 105 to detect an increase in temperature of foreign matter on the cover 121, thereby detecting the presence or absence of foreign matter.

In the foregoing description, as shown in FIGS. 5 and 6, the electrode 117 has a predetermined area. The present disclosure is not limited to this. For example, when a band-like electrode is provided, the electrode may have an open end rather than a loop shape so that an eddy current does not occur due to the high-frequency magnetic field generated by the primary coil 122.

If the end portions of the electrode 117 are electrically connected together, a fine slit may be inserted in the electrode 117 to limit a loop in which an eddy current occurs.

In the foregoing description, in the process of FIGS. 7A and 7B, two criteria which are the threshold and the second threshold are provided to perform a stepwise foreign matter detection etc. Alternatively, for example, the threshold and the second threshold may have the same value, and the single criterion may be used to perform foreign matter detection etc. In other words, a single threshold may be used to determine whether or not foreign matter is actually present.

The coil used in the contactless power transmission device of this embodiment may be of either the plate type or the solenoid type.

Note that any of the above embodiments may be suitably used in combination to simultaneously provide the respective advantages.

In the contactless power transmission device of the present disclosure, foreign matter which is present in or near an electromagnetic field region for feeding power from a power feeder to a power receiver can be reliably detected. Therefore, the contactless power transmission device of the present disclosure is useful for, for example, feeding power to the power receiver of an electric propulsion vehicle to which a human or an object may carelessly or accidentally approach.

What is claimed is:

1. A contactless power transmission device comprising:
 a power receiver;
 a power feeder configured to contactlessly feed power to the power receiver, the power feeder including a primary coil configured to generate magnetic flux by an input alternating current voltage, and a cover configured to cover the primary coil; and
 a capacitive sensor including an electrode and configured to supply an alternating current voltage to the electrode to measure a capacitance occurring between the electrode and foreign matter present around the cover and thereby detect the foreign matter,
wherein
 the frequency of the alternating current voltage of the capacitive sensor is set to be higher than the frequency of the magnetic flux generated by the primary coil.

2. The contactless power transmission device of claim 1, wherein
 the capacitive sensor includes
  a voltage supply unit configured to supply the alternating current voltage to the electrode, and
  a capacitance measurement unit configured to measure the capacitance occurring between the electrode and the foreign matter.

3. The contactless power transmission device of claim 1, wherein
 the frequency of the alternating current voltage is set to be at least twice as high as the frequency of the magnetic flux.

4. The contactless power transmission device of claim 2, wherein
 the capacitive measurement unit includes a C/V converter for converting the capacitance into a voltage value.

* * * * *